(12) United States Patent
Whittemore

(10) Patent No.: US 8,531,753 B1
(45) Date of Patent: Sep. 10, 2013

(54) ADAPTIVE OPTICAL FILTER

(75) Inventor: Stephen Richard Whittemore, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 60 days.

(21) Appl. No.: 13/103,846

(22) Filed: May 9, 2011

(51) Int. Cl.
*G02F 1/07* (2006.01)
*G02B 26/00* (2006.01)

(52) U.S. Cl.
USPC ............................ 359/245; 359/239; 359/246

(58) Field of Classification Search
USPC .................... 359/237–239, 245, 246
See application file for complete search history.

(56) References Cited

U.S. PATENT DOCUMENTS

| | | | |
|---|---|---|---|
| 6,545,758 B1 | 4/2003 | Sandstrom | |
| 6,771,422 B1* | 8/2004 | Clark | 359/625 |
| 6,794,658 B2 | 9/2004 | MacAulay et al. | |
| 6,806,954 B2 | 10/2004 | Sandstrom | |
| 2004/0047030 A1 | 3/2004 | MacAulay | |
| 2010/0079826 A1* | 4/2010 | Yamazaki et al. | 358/475 |

* cited by examiner

*Primary Examiner* — William Choi
(74) *Attorney, Agent, or Firm* — Klarquist Sparkman, LLP

(57) ABSTRACT

Imaging systems include a detector and a spatial light modulator (SLM) that is coupled so as to control image intensity at the detector based on predetermined detector limits. By iteratively adjusting SLM element values, image intensity at one or all detector elements or portions of an imaging detector can be controlled to be within limits. The SLM can be secured to the detector at a spacing such that the SLM is effectively at an image focal plane. In some applications, the SLM can be adjusted to impart visible or hidden watermarks to images or to reduce image intensity at one or a selected set of detector elements so as to reduce detector blooming.

14 Claims, 7 Drawing Sheets

ADAPTIVE OPTICAL FILTER

GOVERNMENT LICENSE RIGHTS

The United States Government has rights in this invention pursuant to Contract No. DE-AC52-06NA25396 between the United States Department of Energy and Los Alamos National Security, LLC for the operation of Los Alamos National Laboratory.

FIELD

This disclosure pertains to adaptive optical filters.

BACKGROUND

Advances in detector arrays such as charge coupled devices (CCDs) permit image acquisition under difficult conditions. In addition, detector arrays have been configured to conveniently acquire data for production of color images so that imaging systems based on detector arrays have become common. Thus, cameras for capture of still and moving images have become widely available for consumer, industrial, and scientific applications.

While detector array based cameras and imaging systems are often practical, such systems are not generally well equipped for imaging very bright objects, especially in images that have high dynamic ranges. In addition, variations of image intensity throughout an image can be sufficiently large that both very dim and very bright images portions occur. The accurate, reliable acquisition of such high dynamic range images can be challenging, and improved methods and apparatus are desirable.

SUMMARY

Detector assemblies include an imaging detector such as an array detector having a plurality of detector elements that define a detector plane, and a spatial light modulator secured to the array detector and spaced apart from the detector plane. Typically, the spatial light modulator includes a plurality of modulator elements that define a modulator plane that is parallel to the detector plane. In some examples, the spatial light modulator elements are situated so as to align with one or more corresponding detector elements. In other examples, the spatial light modulator is a liquid crystal spatial light modulator, and the detector array is a charge-coupled device array. In other alternatives, a controller is configured to establish a transmissivity of at least one modulator element based on a light intensity at one or more corresponding detector elements. In other examples, the controller is configured to reduce the transmissivity of the at least one modulator element based on a magnitude of a detected light intensity. In other embodiments, the controller is configured to adjust the transmissivity of the at least one light modulator element iteratively based on the detected light intensity at the one or more corresponding detector elements. In additional examples, the controller is configured to adjust the transmissivity of the at least one light modulator element based on the detector light intensity and a color component associated with the detected light intensity.

Imaging systems include a lens situated to receive a light flux from an object and form a real image of the object and a detector array situated so as to receive the real image of the object from the lens. A lens aperture is situated to establish a lens f-number, and a spatial light modulator is situated proximate the detector array so as to receive and transmit the light flux associated with the real image to the detector array and to selectively attenuate at least a portion of the received flux. In some examples, the detector array and the spatial light modulator are spaced apart a distance less than about $\frac{1}{10}$ of a detector array length and are substantially parallel. In other examples, the detector array and the spatial light modulator are situated so that one or more detector elements correspond to one or more light modulator elements. In still other examples, a spatial light modulator controller is configured to establish a transmissivity of the modulator elements based on a light intensity received by the detector array. In still further examples, the spatial light modulator controller is coupled to the lens aperture and configured to selectively establish an f-number or a spatial light modulator transmission based on the light intensity received by the detector array. In alternative examples, the spatial light modulator controller is configured to estimate a center of an illuminated area on the detector array, and establish a transmission of at least one light modulator element associated with the estimated center. In other examples lenses or other optical elements are arranged to define focal planes or conjugate planes, and the spatial light modulator and the detector are placed at such planes.

Imaging methods comprise receiving image intensities at a plurality of locations associated with elements of a detector array and determining if at least one or more of the received image intensities is outside of a predetermined limit. For at least one received image intensity that is outside of the predetermined limit, a spatial light modulator element is controlled so as to adjust the associated received image intensity. In typical examples, the predetermined limit is an upper limit and controlling the spatial light modulator element corresponds to reducing the received image intensity so as to be less than the predetermined limit. In further embodiments, a plurality of spatial light modulator elements is controlled so as to apply watermark to an image based on the received image intensities. In still additional examples, an image is formed based on the received intensities and the at least one adjustment provided by the spatial light modulator element. In other examples, the spatial light modulator and the detector comprise respective pluralities of elements and, spatial light modulator element transmissions are stored for a plurality of detector elements. In additional representative embodiments, the spatial light modulator is secured to the detector array so that the detector array and the spatial light modulator elements are situated substantially at an image plane.

These and other features and aspects of the disclosed technology are set forth below with reference to the accompanying drawings.

DETAILED DESCRIPTION

Figure 1:
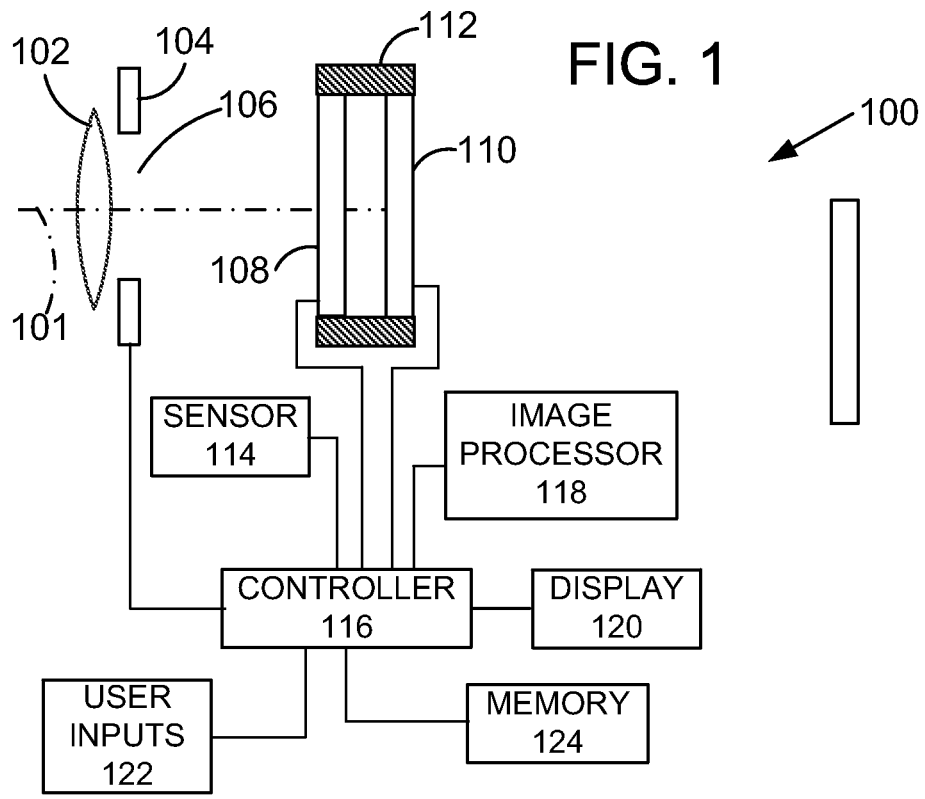
FIG. 1 is a schematic diagram of a representative imaging system that includes a spatial light modulator that is fixed with respect to a detector array.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In the following description, detectors are referred to as comprising a plurality of detector elements arranged in a one or two dimensional array. In many practical examples, each detector element further comprises a plurality of sub-elements for production of color images. These sub-elements can be provided with color filters, and a detector element can include two, three, four, or more sub-elements some of which can be configured to detect a common color components. While in some examples, image production is described with respect to image intensities at detector elements, the disclosed methods and apparatus can be configured based on sub-elements as well. For example, selected spatial light modulator (SLM) modulations can be selected on an element by element or sub-element be sub-element basis. In addition, common color imagers are based on detector arrays that include sub-elements associated with several color components, but color imagers can also use separate detector arrays for each or some color components, or a single detector array can be configured to sequentially receive several color components. This latter approach can be referred to as "frame-sequential" detection. The disclosed methods and apparatus are not to be taken as limited to any particular detector configuration, and the described embodiments are provided to illustrate the principles of the disclosed approach.

While detectors that include arrays of elements can be used, single element detectors such as individual photodiodes, photomultipliers, and other types of detectors can be used. In other examples, detectors such as the cross-delay line detector described in, for example, Siegmund et al., "Cross Delay Line Detectors for High Time Resolution Astronomical Polarimetry and Biological Fluorescence Imaging," IEEE Nuclear Science Symposium, N14-55 (2005). Such detectors include a photocathode coupled to one or more microchannel plates and permit time resolved imaging.

The disclosed examples typically are based on transmissive spatial light modulators that include an array of independently adjustable modulator elements that have variable optical transmission, but reflective modulator or modulators that vary some other optical property can also be used. In some cases, such spatial light modulators include arrays of modulator elements that are associated with particular color components, while in other examples, the spatial light modulator can apply a variable intensity modulation with color selection provided by a color wheel or liquid crystal color shutter. Twisted-nematic based liquid crystal modulators are convenient and can provide about a 250:1 range of intensity attenuation. As used herein, a spatial light modulator configured to modulate image intensity serves as an adaptive optical filter whose optical properties are configurable based on an optical image that is received. However, any specific combinations described below are intended as examples only, and the disclosure is not to be taken as limited to the disclosed examples.

With reference to FIG. 1, an imaging system 100 includes a lens 102, an aperture diaphragm 104, a spatial light modulator (SLM) 108, and a detector 110 (typically an array detector that includes a plurality of detector elements) situated along an axis 101. The SLM 108 and the detector array 110 are secured to each other with a mount 112 that serves to couple the SLM 108 and the detector array 110 so as optical input surfaces that are parallel to each other and at a fixed spacing, typically within 1, 2, 5, or 10 mm. Alternatively, the SLM 108 and the detector array 110 can be situated well apart from each other at optical conjugate planes established by additional relay optics. The SLM 108 and the detector array 110 are typically situated so as to have optical input surfaces that are perpendicular to the axis 101. The spacing is generally selected so that with the lens 102 arranged to image an object on the detector array 110, the SLM 108 is within a depth of focus. While depth of focus is dependent on an aperture 106 established by the aperture diaphragm 104, it is convenient to establish the spacing based on a minimum available aperture diameter (or lens f-number). The SLM 108 and the detector array 110 generally include respective pluralities of light modulator elements and detector elements which are generally arranged in two dimensional arrays.

The lens 102 is illustrated as a single biconvex lens, but can be one or more lens elements, and is generally a compound lens that includes two or more elements. The aperture diaphragm 104 is shown external to the lens 102 but can be situated between lens elements in a compound lens. The axis 101 is shown as a straight line, but an axis can be folded or bent using one or more mirrors, prisms, or other elements and a straight line axis is illustrated for convenience. Generally the modulator elements of the SLM 108 and the detector elements of the detector array 110 are situated in respective planes that are substantially orthogonal to the axis 101. As used herein, substantially orthogonal refers to angles that are within ±1, ±5, or ±10 degrees of perpendicular.

A light sensor 114 is in communication with a controller 116 that receives an indication of potential image illumination intensity so that the controller 116 can adjust image intensity on the detector array 110 as needed. The controller 116 is also coupled to an image processor 118, a display 120, one or more user input devices 122 (for example, computer mouse, touchscreen, or keyboard), one or more memory devices 124 such as read-only memory, random access memory, flash drives, hard disks, CDs, DVDs, or other computer readable storage media. Computer executable instructions for operation of the imaging system 100 can be stored in the memory 124. In some examples, additional features can be provided such as a wired or wireless network connection for sending or receiving data and/or instructions and image processing.

While the controller 116 can determine aperture sizes (and/or exposure times) based on light detected by the sensor 114, the controller 116 can alternatively use electrical signals corresponding to image light intensity at the detector array 110. In addition, the controller 116 can establish exposures based upon a transmissivity of the SLM 108. The SLM 108 includes a plurality of modulator elements, and the controller 116 can establish a transmissivity of one or more modulator elements based on detected intensities at one or more detector elements, without necessarily adjusting SLM elements associated with other detector elements. Moreover, the controller 116 can operate the aperture diaphragm 104 and the SLM 108 so as to establish a suitable light exposure detector element by element as well as an overall light exposure level. In some examples, a user can view a displayed image at the display 120 (or data associated with an image) and select one or more detector elements for which less or more light flux is to be provided and the SLM 108 adjusted accordingly.

The spatial light modulator 108 can be conveniently provided as a liquid crystal modulator having elements that alter a state of polarization of an input light flux and attenuated light flux with one or more absorptive polarizers based on light flux state of polarization. However, other transmissive spatial light modulators can be used. In some less convenient systems, reflective spatial light modulators could be used. Liquid crystal based SLMs typically require polarized light flux for operation, and a suitable polarizer can be included in the SLM 108 or provided elsewhere. If the image is based on a substantially polarized light flux, a polarizer can be omitted.

The controller 116 can be coupled to receive a suitable range of detector element intensities as stored in the memory 124 and to make suitable adjustments based on stored values that can be updated or initialized by a user. The controller 116 can also include a processor that is operable based on computer-executable instructions received from the memory 124. For example, the controller can adjust SLM elements so that all detector elements produce electrical signals within a suitable range or more or less than a particular limit, and then process measured detector values in conjunction with SLM element transmissions to determine image values. The controller 116 can also adjust any signal gain associated with a detector amplifier (not shown in FIG. 1) as well, and include such gain values in image value determination.

Figure 2:
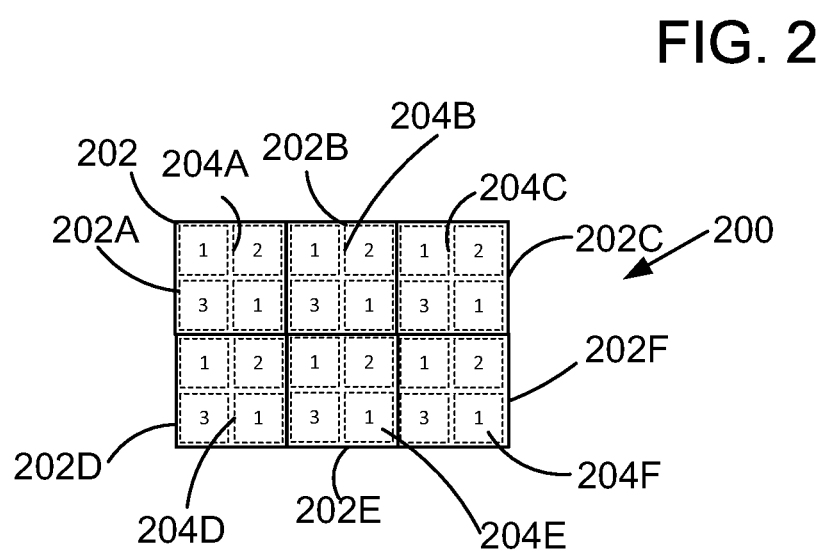
FIG. 2 is a view of a spatial light modulator positioned with respect to a detector array.

With reference to FIG. 2, a representative detector assembly 200 comprises an SLM 202 that includes modulator elements 202A-202F that are secured with respect to a detector array 204 that includes color detector elements 204A-204F, respectively. Most practical examples include larger arrays, but smaller or large arrays, and one or two dimensional arrays can be used. Each of the detector elements is illustrated as including four sub-elements labeled 1, 1, 2, and 3. Typically two sub-elements (1, 1) are configured for detection of an input flux associated with a green color component, and sub-elements 2, 3 are associated with red and blue color components, but other arrangements can be used. In the example of FIG. 2, there is one modulator element for each detector element, and the respective elements are aligned so as to have shared boundaries. The arrangement of FIG. 2 permits simple element by element intensity control at the detector, but the sub-elements (i.e., 1, 1, 2, 3) of any detector element are controlled together. The configuration of FIG. 2 includes an SLM having elements associated with multiple colors, but in other examples a monochromatic SLM could be used.

Figure 3:
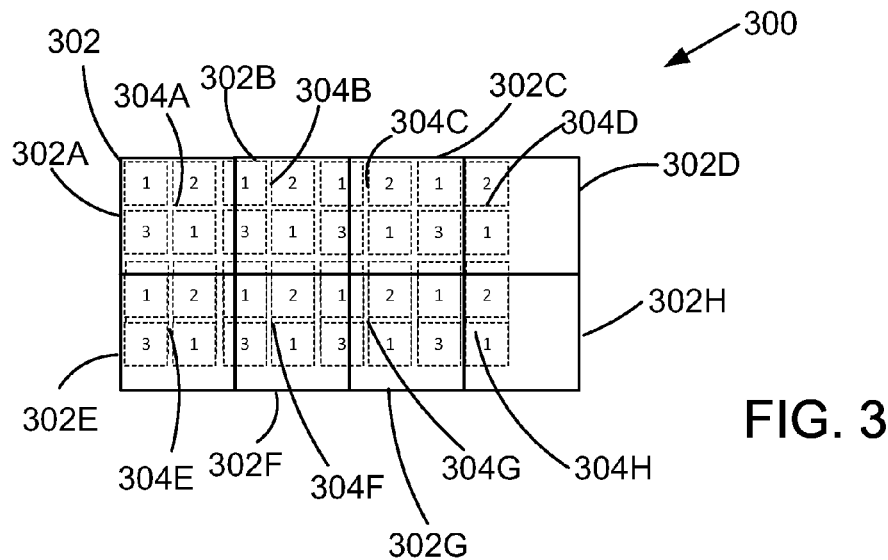
FIG. 3 is a view of a spatial light modulator positioned with respect to a detector array in an alternative arrangement.

With reference to FIG. 3, a representative SLM 302 that includes modulator elements 302A-302H is shown as secured with respect to a detector array 304 that includes color detector elements 304A-304H, respectively. Most practical examples include larger arrays, but smaller or large arrays, and one or two dimensional arrays can be used. The detector array 304 and the SLM 302 need not include the same number of elements. Each of the detector elements is illustrated as including four sub-elements labeled 1, 1, 2, and 3 as described with reference to FIG. 2 above. In the example of FIG. 3, each modulator element typically is associated with two or more detector elements, and the modulator elements and the detector elements do not generally have shared boundaries. For example the modulator element 302B is associated with detector elements 304B, 304C, 304F, 304G. Thus, adjustment of the transmissivity of the modulator element 302B results in varying image intensity at all of these detector elements, or at least at some sub-elements thereof. Although the modulator elements are shown as defining precise areas with respect to detector elements, any image defocusing (such as associated with SLM/detector array displacements) tends to blur area boundaries.

Figure 4:
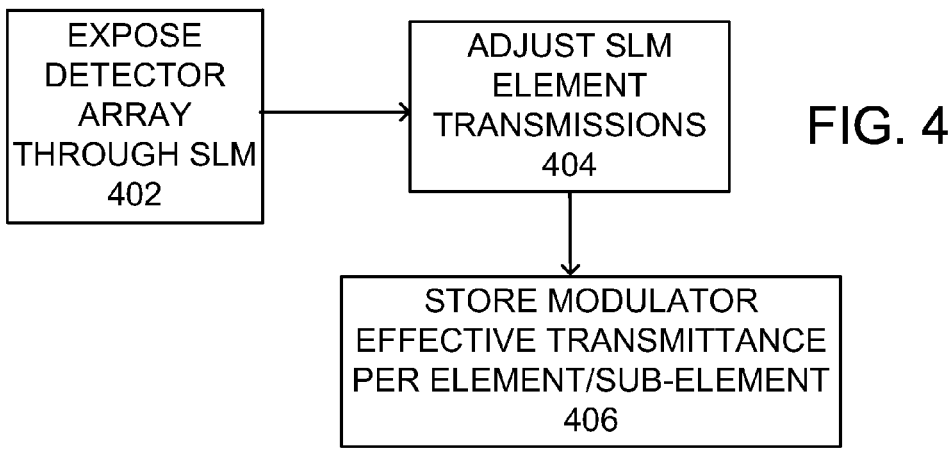
FIG. 4 illustrates a representative image acquisition method.

A representative calibration and compensation method is illustrated in FIG. 4. At 402, a detector array is illuminated so as to apply a substantially uniform illumination to each element/sub-element through an SLM. Such illumination can be applied to the entire array or applied element by element or sub-element by sub-element. At 404, SLM element transmissions are adjusted or varied over a range based on control signals applied to the SLM. At 406, SLM element effective transmittances are recorded for one or more detector elements (or sub-elements). In some applications, SLM element transmission is recorded with respect to a one or more detector elements or sub-elements as a function of a control signal applied to the SLM.

Figure 5:
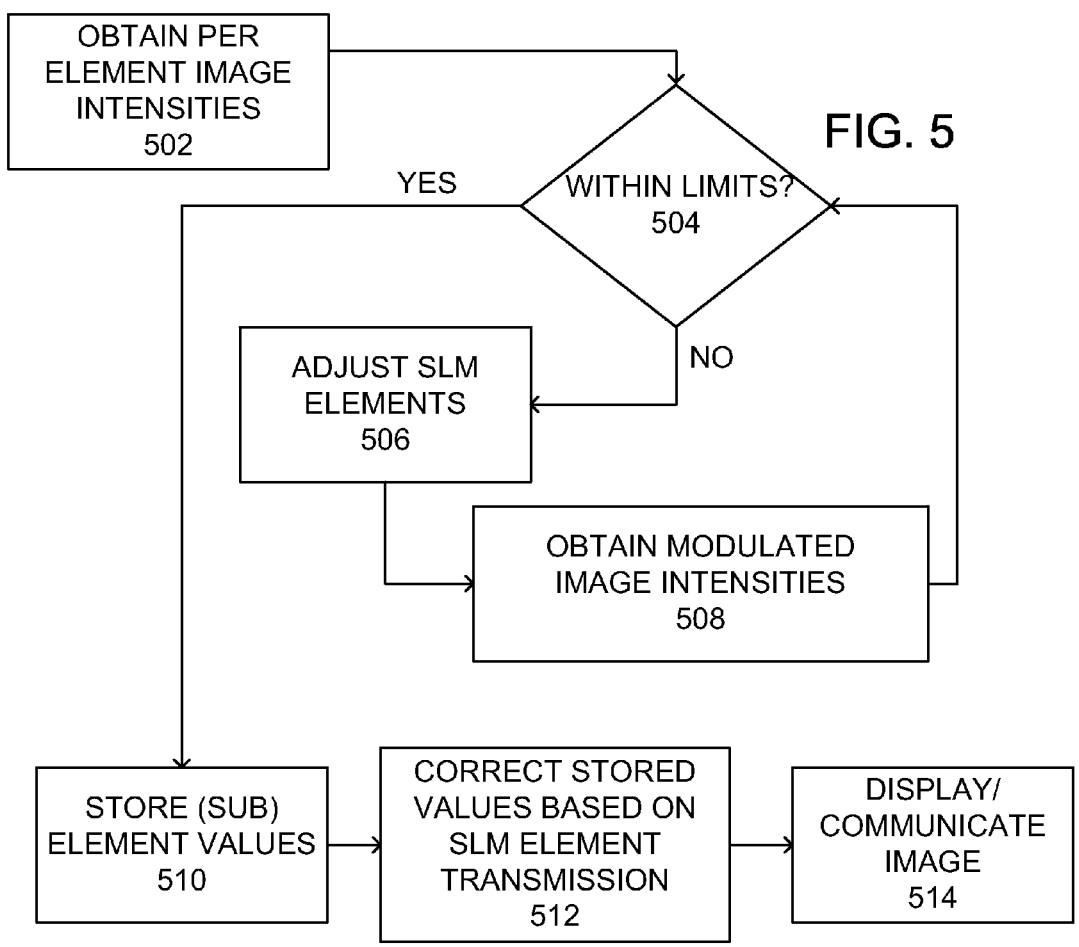
FIG. 5 illustrates a representative image processing method based on SLM transmittance.

With reference to FIG. 5, a representative image acquisition or processing method includes obtaining illumination intensities associated with some or all detector elements/sub-elements at 502 based on detector element/sub-element currents, voltages, or other signals. The detected values are evaluated at 504 to determine if the detector values are within one or more predetermined limits based on a maximum value, a minimum value, or one or more ranges. These values can be functions of one or more of detector element or sub-element location, and can differ for different types of sub-elements. Based on the detected intensities and the evaluation at 504, one or more SLM elements can be adjusted at 506 to increase or decrease transmission, typically so that element detected intensities are expected to be within a predetermined range. In some examples, the SLM elements are adjusted to avoid detector saturation or detector blooming. After SLM element transmission is adjusted, intensities for some, all, or the same set of detector elements/sub-elements are obtained again at 508, and evaluated at 504 to determine in the detected values are acceptable. Alternatively, the SLM element can be adjusted once, so that a second set of detected values are expected to be within a satisfactory range, a single pass correction can be deemed to be acceptable, even if intensity limits are exceeded, although multi-pass correction can typically provide superior correction.

At 510, one or more sets of element or sub-element intensity values can be stored along with associated SLM element transmittances. For example, values associated with an initial set and a modulated set can be stored such that stored values for elements are within predetermined limits in at least one stored set. At 512, a corrected intensity set can be produced for all or a set of elements or sub-elements based on measured intensity values in at least one stored set and the associated SLM element values. Generally values are selected from each set that are within preferred limits, and actual intensity values are determined by compensating for any intensity attenuation applied by the SLM to bring the values within these limits. In some situations, one or more elements have measured intensities that are within limits in more than one set, and average values can be used, or additional limit values can be selected based on ranges in which a detector is particularly noise free, exhibits a linear response, or exhibits some other characteristic that is preferred. At 514 an image data set is displayed, stored, or communicated. Such a data set can include image intensity values for a set of detector element locations that include locations associated with image features of interest or all locations. In some examples, such image data includes values for some or all color components, or for image intensity only. Such image data can be arranged as individual data sets that include arrays of values corresponding to image intensity and color at a plurality of detector locations, or image data can be provided in a preferred encoded format such as a JPEG or TIFF or other format. Typically SLM element values are adjusted so as to apply a constant optical modulation during acquisition of a particular image, but optical modulation can be time varying during image acquisition as well. For example, a sub-element transmission can be set to a constant value, or the sub-element's transmission can vary as a function of time to achieve a transmission equivalent to the constant value.

Figure 6:
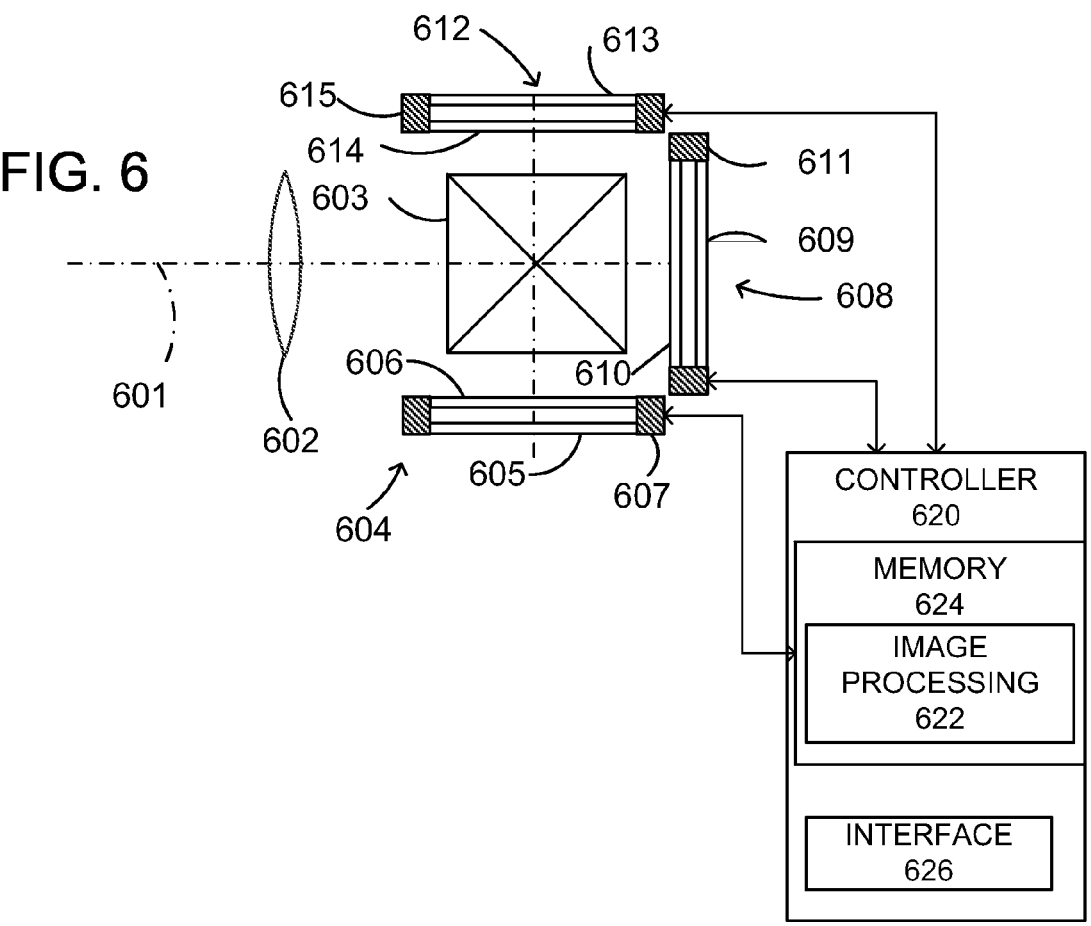
FIG. 6 illustrates an imaging system that includes a plurality of detector/SLM assemblies.

FIG. 6 illustrates a representative imaging system that includes a lens situated to form an image of an object at SLM/detector assemblies 604, 608, 612 that are situated along an axis 601. The detector assemblies include respective detector arrays 605, 609, 613, SLMs 606, 610, 614 that are spaced apart by corresponding spacer assemblies 607, 611, 615. In this example, the detector arrays are configured for detection of input intensity, and color selection for each can be provided by dichroic coatings used in a beam splitter 603 that directs color components to different detector arrays. A controller 620 is coupled to the detector arrays and the SLMs to interrogate received intensities and to adjust transmissions of the SLMs as desired. The controller 620 includes a memory 624 that stores computer executable instructions 622 for image processing (both recording data and controlling SLMs) as well as at least one interface 626 such as a wired or wireless connection for communicating data and receiving user input for data acquisition.

Figure 7:
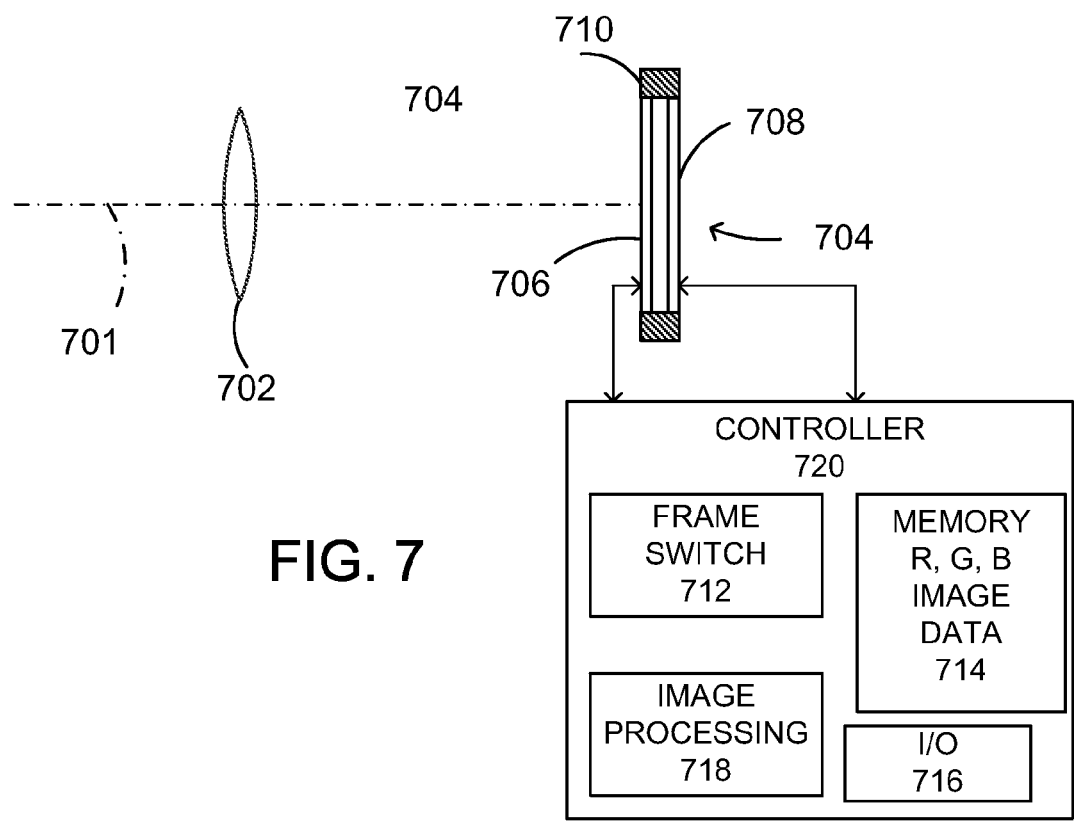
FIG. 7 illustrates an imaging system based on frame sequential image acquisition.

FIG. 7 illustrates an image acquisition system that includes a lens 702 that forms an image of an object at a detector assembly 704 that is situated on an axis 701. The detector assembly 704 includes an SLM 706 that is coupled to a detector array 708 with spacer assembly 710, or the SLM 706 and the detector array 708 can be bonded together. The SLM 706 is electrically coupled to a frame switch 712 that is provided as part of a controller 720. The frame switch 712 is configured to sequentially apply SLM control signals associated with selected SLM element transmissions for each of a series of color components to the SLM 706. Generally, the frame switcher 712 cycles through suitable values periodically. For example, if red, green, and blue color components are of interest, the SLM 706 can be periodically driven so as to provide suitable transmissions for these colors, and the corresponding detector intensities recorded. A sequence of three recorded intensities can be used to reconstruct a color image, and transmission for each of the three colors can be selected independently for each SLM element. As shown in FIG. 7, color selection is included in the SLM 706 using, for example, a suitable arrangement of color polarizers, but a separate color wheel can be provided if more convenient.

The controller includes memory 714 that stores frame image data (such as independent R, G, B images) that can be used as a basis for selection of SLM transmissions in association with a preferred range of values at the detector 708. SLM element transmission can be selected as a constant value for one or more SLM elements during image acquisition, or SLM element transmission can be modulated during transmission in order to establish an effective transmission based on a total on time during the acquisition. The controller 720 also includes additional memory, input/output devices 716 and computer-executable 718 instructions for image processing.

Figure 8:
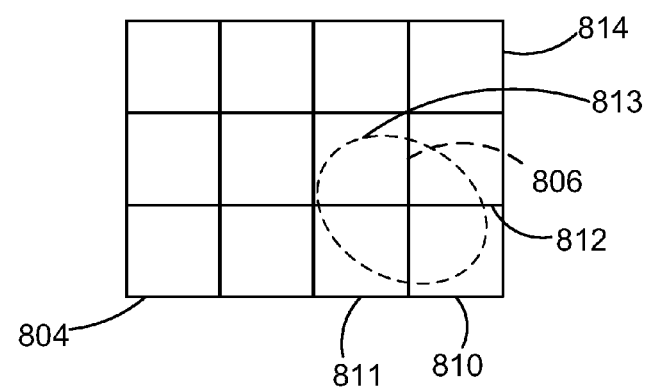
FIG. 8 illustrates an example application of a representative method to control image intensity selected detector elements.

One example application of the disclosed technology is described with reference to FIG. 8. A representative image at an image sensor includes an area of interest 806 that is associated with an image intensity that exceeds a predetermined limit. Accordingly, the corresponding elements 810-813 of an SLM 814 are controlled so as to reduce the image intensity for improved detection.

In some examples, a center of a bright spot (i.e., a location at which detector received intensity exceeds limits) is determined by estimating a center of the bright spot. In example, such a spot is assumed to be symmetric about perpendicular axes, and location of the center can be determined as a location about which the spot is symmetric.

Figure 9:
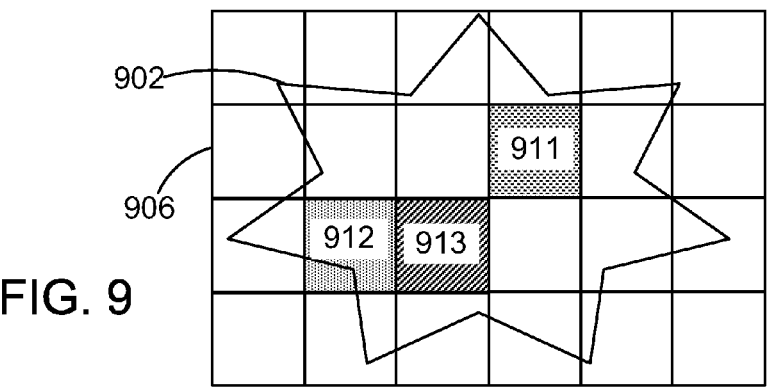
FIG. 9 illustrates an example application in which an SLM is used to apply a watermark to an image.

Another example application is illustrated in FIG. 9. As shown in FIG. 9, an image 902 formed at a detector surface (not shown in FIG. 9) through an SLM 906. While the SLM 906 can be controlled to produce preferred intensities at the detector surface, in addition, a visible or hidden watermark can be applied based on image intensity modulation associated with the SLM elements 911-913 that are applied to the image by the SLM 906. Such modulation can be based on all or some SLM elements, and the associated modulation can be binary or multi-valued. The SLM elements used can be contiguous or spread apart. The modulation can be applied so as to be imperceptible to a user, but can be made apparent if desired.

In further examples, an SLM is situated at or near an imaging system aperture stop so as to provide a variable aperture that can not only control a total light flux that is directed to a detector, but can be shaped differently along different axes SLM element by element so as to provide apertures of arbitrary shape including circular, elliptical, rectangular, polygonal or other shapes. In addition, such an SLM can be controlled to selectively block light propagating along a system optical axis and transmit other light, and thus serve as a variable on-axis light stop. By situating a SLM controlled to provide a variable aperture at different locations, a detector can receive an image that is shaped by the variable aperture, typically wherein the variable aperture is somewhat blurred or softened in the image. If placed to serve as a variable aperture stop, an SLM can be controlled to provide image depth of field that is variable across an image based on, for example, the total light flux available. For example, relatively bright image portions (even those within detector limits) can be imaged with a smaller aperture stop defined by an SLM so as to enhance image depth of field in selected locations.

Figure 10:
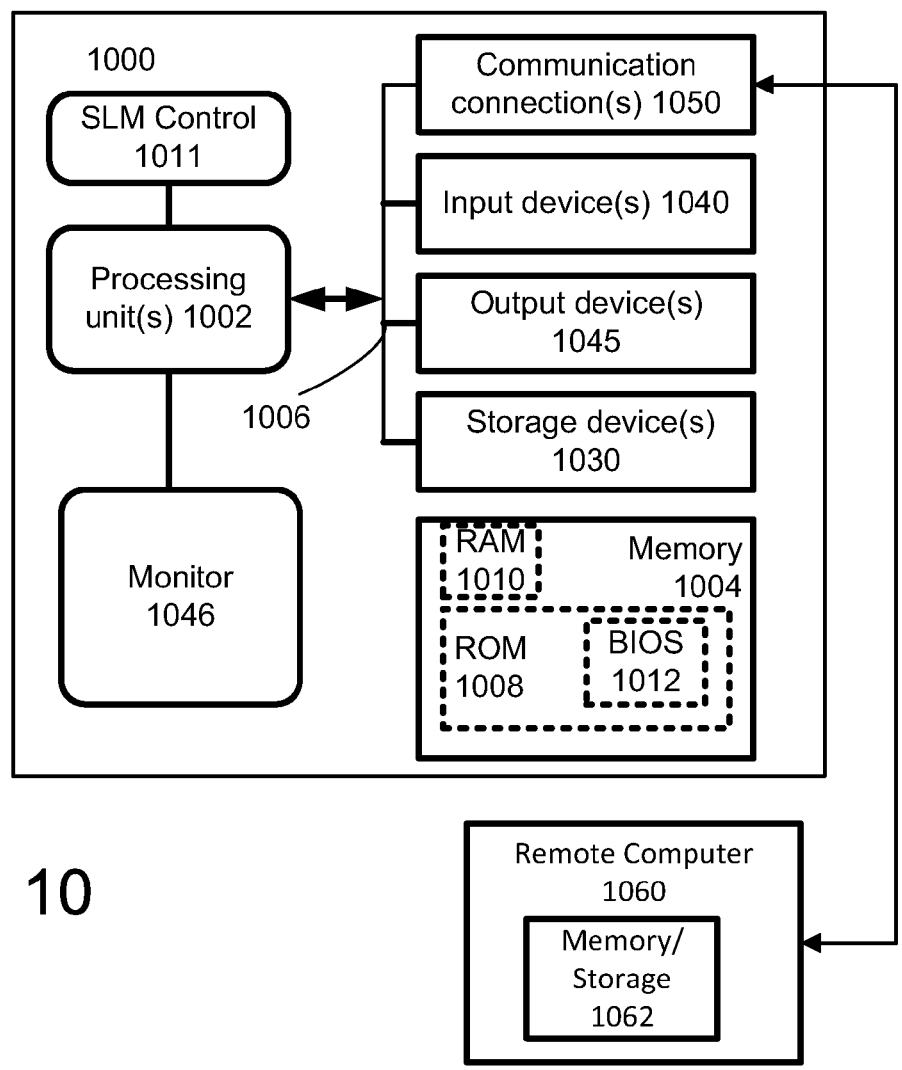
FIG. 10 illustrates a representative computer environment for processing image data as disclosed herein.

FIG. 10 and the following discussion is intended to provide a brief, general description of an exemplary processing environment in which the disclosed technology may be implemented. Although not required, the disclosed technology is described in the general context of computer-executable instructions for image control, such as program modules, being executed by a personal computer (PC) or other dedicated or general purpose processing system. In some convenient examples, a dedicated processor is provided with a detector/SLM module. Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the disclosed technology includes a general purpose computing device in the form of an exemplary conventional PC 1000, including one or more processing units 1002, a system memory 1004, and a system bus 1006 that couples various system components including the system memory 1004 to the one or more processing units 1002. The system bus 1006 may be any of several types of bus structures including a memory bus or memory controller, a peripheral bus, and a local bus using any of a variety of bus architectures. The exemplary system memory 1004 includes read only memory (ROM) 1008 and random access memory (RAM) 1010. A basic input/output system (BIOS) 1012, containing the basic routines that help with the transfer of information between elements within the PC 1000, is stored in ROM 1008. A memory 1011 is provided for storage of computer-executable instructions for detector and SLM control, and generating one or more image data sets based on image data sets acquired with one or more settings of the SLM.

The exemplary PC 1000 further includes one or more storage devices 1030 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1006 by a hard disk drive interface, a magnetic disk drive interface, and an optical drive interface, respectively. The drives and their associated computer-readable media provide nonvolatile storage of computer-readable instructions, data structures, program modules, and other data for the PC 1000. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1030 including an operating system, one or more application programs, other program modules, and program data. A user may enter commands and information into the PC 1000 through one or more input devices 1040 such as a keyboard and a pointing device such as a mouse. Other input devices may include a digital camera, microphone, joystick, game pad, satellite dish, scanner, or the like. These and other input devices are often connected to the one or more processing units 1002 through a serial port interface that is coupled to the system bus 1006, but may be connected by other interfaces such as a parallel port, game port, or universal serial bus (USB). A monitor 1046 or other type of display device is also connected to the system bus 1006 via an interface, such as a video adapter. Other peripheral output devices, such as speakers and printers (not shown), may be included.

The PC 1000 may operate in a networked environment using logical connections to one or more remote computers, such as a remote computer 1060. In some examples, one or more network or communication connections 1050 are included. The remote computer 1060 may be another PC, a server, a router, a network PC, or a peer device or other common network node, and typically includes many or all of the elements described above relative to the PC 1000, although only a memory storage device 1062 has been illustrated in FIG. 10. The personal computer 1000 and/or the remote computer 1060 can be connected to a logical a local area network (LAN) and a wide area network (WAN). Such networking environments are commonplace in offices, enterprise-wide computer networks, intranets, and the Internet.

When used in a LAN networking environment, the PC 1000 is connected to the LAN through a network interface. When used in a WAN networking environment, the PC 1000 typically includes a modem or other means for establishing communications over the WAN, such as the Internet. In a networked environment, program modules depicted relative to the personal computer 1000, or portions thereof, may be stored in the remote memory storage device or other locations on the LAN or WAN. The network connections shown are exemplary, and other means of establishing a communications link between the computers may be used.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. Particular examples are described with reference to transmissive liquid crystal based SLMs and array detectors, but other SLMs and other detectors can be used. In view of the many possible embodiments to which the principles of the invention may be applied, it should be recognized that the illustrated embodiments are examples of the invention and should not be taken as a limitation on the scope of the invention. I therefore claim as my invention all subject matter that comes within the scope and spirit of these claims. Alternatives specifically addressed in these sections are merely exemplary and do not constitute all possible alternatives to the embodiments described herein.

I claim:

1. An imaging system, comprising:
a lens situated to receive a light flux from an object and form a real image of the object;
an imaging detector situated so as to receive the real image of the object from the lens, wherein the imaging detector is a detector array that includes a plurality of detector elements;
a lens aperture situated to establish a lens f-number; and
a spatial light modulator situated proximate the lens so as to receive and transmit the light flux associated with the real image to the detector array and to selectively attenuate at least some portion of the received flux, wherein the spatial light modulator includes a plurality of light modulator elements, and the imaging detector and the spatial light modulator are situated so that one or more of the detector elements correspond to one or more of the light modulator elements, wherein the spatial light modulator is secured to the lens or the imaging detector and the plurality of light modulator elements define a modulator plane that is parallel to a detector plane.

2. The imaging system of claim 1, wherein the light modulator elements are situated so as to align with one or more corresponding detector elements.

3. The imaging system of claim 1, wherein the spatial light modulator is a liquid crystal spatial light modulator.

4. The imaging system of claim 1, wherein the imaging detector is a charge-coupled device array.

5. An imaging system, comprising:
a lens situated to receive a light flux from an object and form a real image of the object;
an imaging detector situated so as to receive the real image of the object from the lens, wherein the imaging detector is a detector array that includes a plurality of detector elements;
a lens aperture situated to establish a lens f-number;
a spatial light modulator situated proximate the lens so as to receive and transmit the light flux associated with the real image to the detector array and to selectively attenuate at least some portion of the received flux, wherein the spatial light modulator includes a plurality of light modulator elements; and
a spatial light modulator controller that is configured to establish a transmissivity of the light modulator elements based on a light intensity received by at least a portion of the imaging detector and to establish a transmissivity of at least one modulator element based on a light intensity at one or more detector elements, wherein the spatial light modulator controller is configured to adjust the transmissivity of the at least one light modulator element of the spatial light modulator iteratively based on a detected light intensity at one or more corresponding detector elements.

6. The imaging system of claim 5, wherein the spatial light modulator controller is coupled to the lens aperture and configured to selectively establish an f-number or a spatial light modulator transmission based on the light intensity received by the imaging detector.

7. The imaging system of claim 5, wherein the spatial light modulator controller is configured to estimate a center of an illuminated area on the imaging detector, and establish a transmission of at least one light modulator associated with the estimated center.

8. The imaging system of claim 5, wherein the spatial light modulator controller is configured to reduce the transmissivity of the at least one modulator element of the spatial light modulator based on the magnitude of a detected light intensity.

9. The imaging system of claim 5, wherein the at least one light modulator element of the spatial light modulator is configured to reduce a received intensity at least one detector element so as to be less than a predetermined limit.

10. The imaging system of claim 5, wherein the plurality of light modulator elements are situated so as to align with one or more corresponding detector elements.

11. The imaging system of claim 5, wherein the spatial light modulator is a liquid crystal spatial light modulator.

12. The imaging system of claim 5, wherein the imaging detector is a charge-coupled device array.

13. An imaging system, comprising: a lens situated to receive a light flux from an object and form a real image of the object; an imaging detector situated so as to receive the real image of the object from the lens, wherein the imaging detector is a detector array that includes a plurality of detector elements; a lens aperture situated to establish a lens f-number; a spatial light modulator situated proximate the lens so as to receive and transmit the light flux associated with the real image to the detector array and to selectively attenuate at least some portion of the received flux, wherein the spatial light modulator includes a plurality of light modulator elements; and a spatial light modulator controller configured to establish a transmissivity of the light modulator elements based on a light intensity received by at least a portion of the imaging detector and to establish a transmissivity of at least one modulator element based on a light intensity at one or more detector elements, wherein the spatial light modulator controller is configured to adjust the transmissivity of the at least one light modulator element based on a detected light intensity and a color component associated with the detected light intensity.

14. An imaging system, comprising: a lens situated to receive a light flux from an object and form a real image of the object; an imaging detector situated so as to receive the real image of the object from the lens, wherein the imaging detector is a detector array that includes a plurality of detector elements; a lens aperture situated to establish a lens f-number; a spatial light modulator situated proximate the lens so as to receive and transmit the light flux associated with the real image to the detector array and to selectively attenuate at least some portion of the received flux, wherein the spatial light modulator includes a plurality of light modulator elements; and a spatial light modulator controller configured to establish a transmissivity of the light modulator elements based on a light intensity received by at least a portion of the imaging detector, wherein the spatial light modulator is secured to the lens or the imaging detector and the plurality of light modulator elements define a modulator plane that is parallel to a detector plane.

* * * * *